April 27, 1926.
F. E. GOODALL
1,582,677
MACHINE FOR TREATING FOODS AND OTHER SUBSTANCES WITH RAYS
Filed Jan. 22, 1925        2 Sheets-Sheet 2
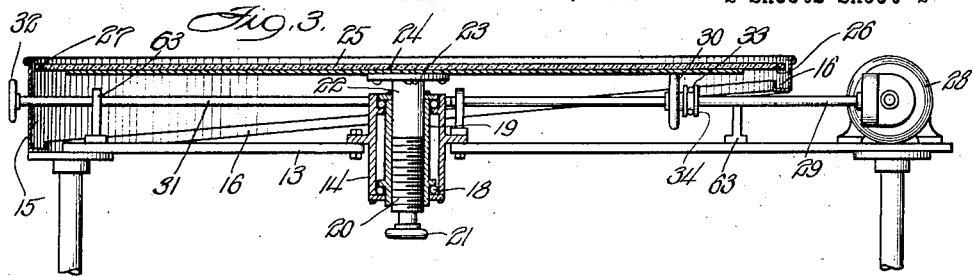
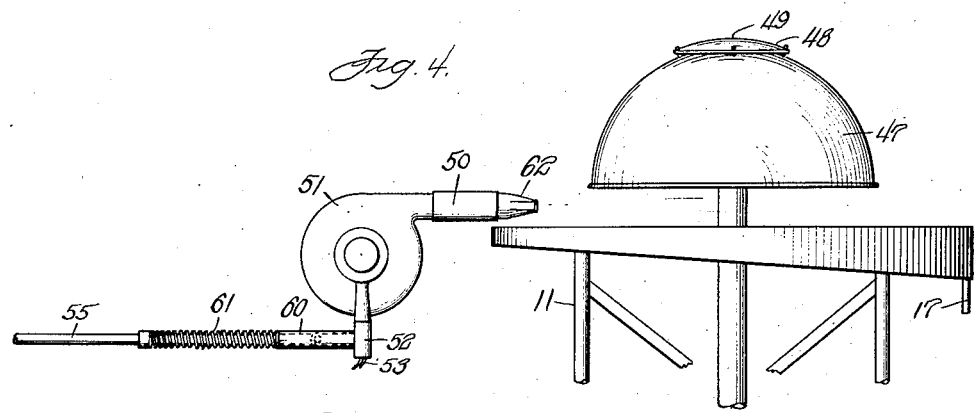
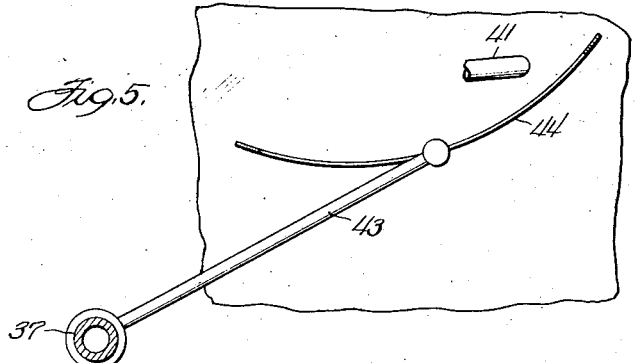
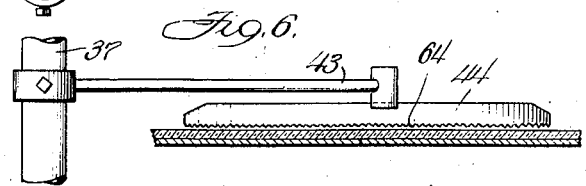
Witness:
C. R. Olson
Inventor:
FRED E. GOODALL
Carl Hoover
By            atty Patented Apr. 27, 1926.

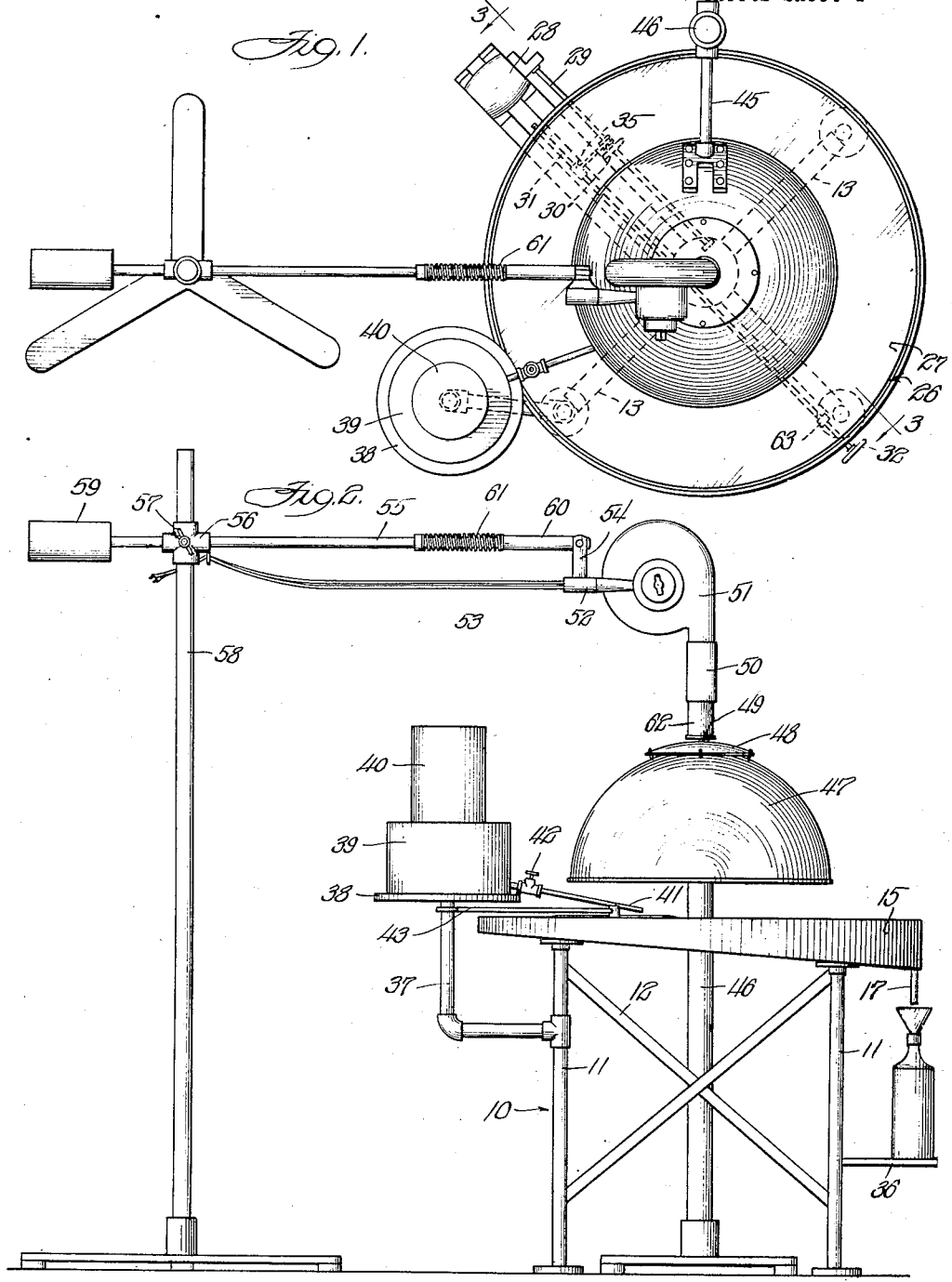

1,582,677

UNITED STATES PATENT OFFICE.

FRED E. GOODALL, OF CHICAGO, ILLINOIS.

MACHINE FOR TREATING FOODS AND OTHER SUBSTANCES WITH RAYS.

Application filed January 22, 1925. Serial No. 4,134.

*To all whom it may concern:*

Be it known that I, FRED E. GOODALL, a citizen of the United States, residing in the city of Chicago, county of Cook, and State of Illinois, have invented a new and useful Machine for Treating Foods and Other Substances with Rays, of which the following is a specification.

The object of my invention is primarily to provide means by which foods and other substances may be, to a large extent automatically, exposed to, and treated with, ultra-violet and actinic rays in an exact and systematic manner; also to provide means for increasing the effect of the rays used beyond that which would result from mere direct exposure; also to provide means by which any ozone, created by the rays used, may be either driven against the food under treatment so as to impregnate it with ozone, or deflected from such food without interfering with the effect of the rays on the food; also in other ways, hereinafter more fully shown, to facilitate and make more effective the treatment of foods and other substances by means of ultra-violet and actinic rays.

In the drawings Fig. 1 is a top plan view of my device as used, in connection with a mercury quartzlamp, for the purpose of treating fluids with ultra-violet and actinic rays, and at the same time impregnating them, as far as practicable, with the ozone created by the rays of the lamp; Fig. 2 is a side elevation of the apparatus shown in Fig. 1; Fig. 3 is a sectional elevation, in the plane indicated by lines 3—3 in Fig. 1, of a portion of my device; Fig. 4 is a side elevation of a portion of the apparatus illustrated in Fig. 2, shown in connection with means for deflecting any ozone, created by the rays, from the fluid or other substance which is being treated by means of the rays; Fig. 5 is a top plan view of the distributing and stirring means used in connection with my device; and Fig. 6 is a side elevation of the parts shown in Fig. 5.

Referring to the drawings, upon a frame 10, made up chiefly of tubular legs 11, cross-braces 12, radial members 13 and tubular hub 14, there is mounted a cylindrical rim 15, the lower edge of which is bent inward and upward so as to form an inclined trough 16 at the lowest point of which there is provided out-let pipe 17. In hub 14 there is rotatably mounted, on ball bearings 18, hollow sleeve 19 the lower end of which is threaded so as to accommodate threaded plug 20, provided with handle 21. In the upper end of sleeve 19 there is mounted, with a snug sliding fit, flanged stem 22, to which is attached, by means of screws 23, a preferably round metal plate 24 which in turn carries, superimposed upon it, reflector 25, reflecting upwards and made slightly smaller in diameter than rim 15. Near its outer edge reflector 25 is preferably provided on its lower side with circular groove 26 so as to form around this groove a dripping edge 27 above trough 16. Above one of legs 11 there is mounted, near the outer edge of rim 15, an electric motor 28 to which is geared a horizontal rod 29 which projects towards hub 14 and to which there is slidingly, but not rotatably, attached a friction wheel 30, adapted to engage the lower face of plate 24. Parallel to, and near, rod 29 there is mounted a threaded control rod 31, preferably provided with wheel handle 32, from which a fork 33 projects and engages collar 34 which is attached to wheel 30. Rod 31 being so mounted on its supports 63 as to be rotatable, but not to be movable lengthwise, and engaging with its threads threaded sleeve 35 to which fork 30 is attached, it will readily be seen that by turning handle 32 one way or the other, wheel 30 may be moved either towards or away from hub 14, thereby either increasing or decreasing the speed at which plate 24 and reflector 25 will be rotating when motor 28 is running. The proper adjustment of plate 24 with reference to wheel 30, so as to secure the proper degree of friction, and to compensate for wear, is effected by turning handle 21. A suitable support 36 is mounted on frame 10 for the purpose of carrying a bottle or other vessel under out-let pipe 17. There is also attached to frame 10, by means of bracket 37, a small table 38, supporting fluid tank 39 which is adapted to hold inverted bottle 40 and is provided with a discharge tube 41, controlled by value 42, the lower end of which tube preferably extends to a point closely above and near the center of reflector 25. Below table 38 there is adjustably attached to bracket 37 an arm 43 which carries, depending from its outer end, a preferably curved vertical plate 44, adjustably set so as to approach closely to the upper surface of reflector 25, and preferably provided with downwardly projecting prongs 64 adapted to project into, stir and distribute any material spread on the surface of the reflector. Mounted, by means of an arm 45, on a stand 46, there is hanging over the center of reflector 25 a quartzlamp 47 surmounted by a reflector 48. An opening 49 being provided in the top of reflector 48, the discharge pipe 50 of an electrical blower 51 is brought to register with this opening whenever it is desired to drive the ozone, created by the rays of the quartzlamp, against the fluid that may be discharged from tank 39 onto the surface of reflector 25. Blower 51 is preferably mounted on a hollow bracket 52, adapted to accomodate electric feed wires 53 and provided, at right angles thereto, with an arm 54 which is pivotally attached to the outer end of a carrying rod 55. Rod 55 is adjustably attached, by means of bracket 56 and thumb screw 57, to a movable stand 58, carries, to offset the weight of blower 51, a counter weight 59, and is provided, immediately adjoining arm 54 with a sleeve 60, adapted to be moved over arm 54 when arm 54 is brought into horizontal position, and with a compression spring 61 adapted automatically to push sleeve 60 over arm 54 whenever arm 54 is brought into horizontal position.

In case it is desired to protect the fluid on reflector 25 from the ozone generated by lamp 47, blower 51, instead of being placed in the position shown in Figs. 1 and 2, is placed in horizontal position, incidentally causing arm 54 to be engaged by sleeve 60, as shown in Fig. 4. A flat nozzle 62, adapted to distribute the discharge from blower 51 horizontally over the whole upper surface of reflector 25, is thereupon attached to blower 51, in lieu of the round discharge pipe shown in Figs. 1 and 2, and blower 51 is lowered to a position where its discharge will take place horizontally directly above reflector 25. It will readily be seen that the discharge from blower 51, when placed in this position, will effectively prevent the ozone generated by lamp 46 from affecting any material spread on the surface of reflector 25. At the same time the discharge from blower 51, consisting merely of a sheet of moving air, will in no wise interfere with the rays from lamp 47 reaching this material, as would be the case if a glass plate, or any other solid substance were used for keeping the ozone away from the material spread on reflector 25.

Any oil or other fluid, supplied to tank 39 by inverted bottle 40 may, by means of opening valve 42 to the required degree, be discharged through tube 41, at any rate of speed desired, upon the center of reflector 25. Motor 28 being simultaneously turned on so as to rotate wheel 30, plate 24 and reflector 25 will then be rotated at any suitable speed, regulated by means of wheel-handle 32, with the result that by the joint action of pronged plate 44 and the rotation of reflector 25, the fluid discharged from tube 41 will be gradually and evenly spread over the surface of reflector 25, will move from its center towards its circumference at a velocity depending mainly on the speed at which plate 24 and reflector 25 are rotated, and will finally be thrown off the edges of reflector 25 against the rim 15 and into trough 16, whence it will flow through outlet pipe 17 into a bottle or other vessel placed on support 36. Lamp 47 being turned on while the fluid from tube 41 is discharged upon, and moves over, the surface of reflector 25, such fluid will not only be illuminated from above, by the direct rays from the lamp 47, but will also be illuminated by the reflection of these rays as they are thrown back from the surface of reflector 25. Furthermore by means of the action of pronged plate 44 and by the continuous movement of the fluid over reflector 25, each molecule of the fluid thereon will be kept in constant motion so that each such molecule will be exposed during its journey, from the center of reflector 25 to its outer edge, to the rays of the lamp, and the reflection of such rays, from each possible angle, and in this manner a very thorough, systematic and uniform irradiation of the molecules of the fluid discharged on the reflector will be attained. It is of course evident that my machine may be used without any such reflecting surface.

While I have illustrated my device as used for the treatment of fluids, it will readily be seen that with suitable modifications my device may easily be adapted for the purpose of exposing grains and other substances in a systematic and thorough manner to ultra-violet and actinic rays, and that my device may otherwise be modified without departing from the spirit of my invention. Any and all of such modifications I intend to cover by my claims.

I claim:

1. A machine for automatically irradiating matter, comprising a lamp producing ultra-violet and actinic rays; a rotary support to carry the matter during treatment; automatic means for supplying the matter to the support at a predetermined rate of speed; and means for rotating the support at a speed sufficient for the utilization of centrifugal force as a means for regulating the movement of the matter on the support.

2. A machine for automatically irradiating matter, comprising a lamp producing ultra-violet and actinic rays; a rotary support to carry the matter during treatment; and a circular tray, surrounding the support for receiving the treated matter.

3. A machine for treating matter, comprising a source of ultra violet light, a rotary support for said matter during treatment, and means for revolving said support at a speed sufficient for the utilization of centrifugal force as a means for regulating the movement of the matter on the support.

4. In a machine of the class described, a source of ultra-violet and actinic rays, a plane rotatable surface exposed to said rays, and means for introducing a stream of material to be treated onto said surface.

5. In a machine of the class described, a source of ultra-violet and actinic rays, a level surface adapted to be rotated beneath said source, means for introducing a stream of material to be treated onto said surface and means for stirring and distributing said material on said surface.

6. In a machine of the class described, a source of ultra-violet and actinic rays, a plane reflecting surface adapted to be rotated beneath said source, means for introducing a regulated stream of material to be treated onto said surface near the center thereof, means for variably rotating said surface and means for stirring and distributing the film material on said surface.

7. In a machine of the class described, a source of ultra-violet and actinic rays, a plane reflecting surface adapted to be rotated beneath said source, means for introducing a regulated stream of material to be treated onto said surface near the center thereof, means for variably rotating said surface and means for stirring and distributing the film material on said surface, comprising a curved vertical plate having prongs extending into the film of material.

FRED E. GOODALL.